US008465354B2

(12) United States Patent
Matsumoto et al.

(10) Patent No.: US 8,465,354 B2
(45) Date of Patent: Jun. 18, 2013

(54) GAME APPARATUS AND COMPUTER PROGRAM USED FOR THE SAME

(75) Inventors: Naoko Matsumoto, Tokyo (JP); Hiroyuki Masuda, Tokyo (JP); Masanori Kono, Tokyo (JP); Yoshito Fukuda, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 69 days.

(21) Appl. No.: 12/935,428

(22) PCT Filed: Mar. 31, 2009

(86) PCT No.: PCT/JP2009/056599
§ 371 (c)(1),
(2), (4) Date: Jan. 3, 2011

(87) PCT Pub. No.: WO2009/123165
PCT Pub. Date: Oct. 8, 2009

(65) Prior Publication Data
US 2011/0105227 A1    May 5, 2011

(30) Foreign Application Priority Data

Mar. 31, 2008 (JP) .............................. 2008-091597

(51) Int. Cl.
*A63F 9/24*    (2006.01)
(52) U.S. Cl.
USPC .......................................................... 463/6
(58) Field of Classification Search
USPC ....................................................... 463/6, 46
See application file for complete search history.

(56) References Cited

U.S. PATENT DOCUMENTS

| 2002/0138853 | A1  | 9/2002  | Chuuma et al. |
| 2002/0155888 | A1* | 10/2002 | Kitsutaka ..................... 463/30 |
| 2004/0002389 | A1* | 1/2004  | Sartini ......................... 463/46 |
| 2005/0049049 | A1* | 3/2005  | Griswold et al. .............. 463/46 |
| 2007/0111768 | A1* | 5/2007  | Tipping et al. ................. 463/6 |

FOREIGN PATENT DOCUMENTS

| JP | 2000-218046 | 8/2000 |
| JP | 2001-120835 | 5/2001 |
| JP | 2001-120836 | 5/2001 |

(Continued)

OTHER PUBLICATIONS

International Search Report for International Application No. PCT/JP2009/056599 (Apr. 28, 2009).
Office Action in corresponding Chinese Application No. 2009801109865 (Aug. 30, 2012).

*Primary Examiner* — David L Lewis
*Assistant Examiner* — Eric M Thomas
(74) *Attorney, Agent, or Firm* — Edwards Wildman Palmer LLP; Brian R. Landry

(57) ABSTRACT

At a game apparatus 1 which instructs a player the time to operate a play button 5p of each operation unit 4 by moving an operation indicator 102 toward an operation criterion line 101 on a monitor 3 having a display surface 3a facing upward, while the appearance position of the operation indicator 102 being varied, the moving speed of the operation indicator 102 is calculated based on the distance from the appearance position up to the position corresponding to each operation unit 4 on the operation criterion line 101, and the access time that it takes for the operation indicator 102 to reach the operation criterion line 101. Based on the moving speed, the game apparatus varies by degrees the display position of the operation indicator 102.

7 Claims, 10 Drawing Sheets

FOREIGN PATENT DOCUMENTS

| | | |
|---|---|---|
| JP | 2002-306841 | 10/2002 |
| JP | 2003-205174 | 7/2003 |
| JP | 2003-236243 | 8/2003 |

* cited by examiner

| TIME | R | G | B |
|---|---|---|---|
| t0 | 1 | 0 | 0 |
| t1 | 1 | 0 | 0 |
| t2 | 0 | 1 | 0 |
| t3 | 0 | 0 | 1 |
| t4 | 1 | 0 | 0 |
| t5 | 0 | 1 | 0 |
| t6 | 0 | 1 | 0 |
| t7 | 0 | 0 | 1 |
| t8 | 0 | 1 | 0 |
| t9 | 0 | 0 | 1 |
| t10 | 0 | 1 | 0 |
| t11 | 1 | 0 | 0 |
| t12 | 0 | 1 | 0 |
| t13 | 0 | 1 | 0 |
| t14 | 1 | 0 | 0 |
| t15 | 0 | 0 | 1 |
| t16 | 0 | 1 | 0 |
| t17 | 1 | 0 | 0 |
| t18 | 1 | 0 | 0 |
| t19 | 0 | 1 | 0 |
| t20 | 0 | 0 | 1 |
| ... | ... | ... | ... |

GAME APPARATUS AND COMPUTER PROGRAM USED FOR THE SAME

CROSS-REFERENCE TO RELATED APPLICATION

This application is the national phase application, pursuant to 35 U.S.C. §371, of International Application No. PCT/JP2009/056599, filed Mar. 31, 2009, which claims the benefit of priority of Japanese Patent Application No. JP 2008-091597, filed Mar. 31, 2008. These applications are hereby incorporated herein by reference in their entireties.

TECHNICAL FIELD

The present invention relates to a game apparatus in which operations are indicated on a display, and a computer program used for the same.

BACKGROUND ART

There is already known a game apparatus which moves on a display, an operation indicator which indicates an operation of a specific operation member in an operation unit, and evaluates an operation of a player based on a difference between the timing when the operation indicator has reached a predetermined indication position and the timing when the player has operated the operation member corresponding to the operation indicator (for example, refer to the patent literature 1). There is also already known a game apparatus in which a plurality of operation units are disposed around a display surface of a display device, and players are made play a game common to them (for example, refer to the patent literature 2).
Patent Literature 1: JP-A-2000-218046
Patent Literature 2: JP-A-2003-236243

SUMMARY OF INVENTION

Technical Problem

In a conventional game apparatus, the appearance position on a display of the operation indicator is fixed at a constant position. Namely, a player recognizes that the operation indicator always appears at the constant position. This could become a reason which makes a player feel boring. On this point, the conventional operation indication should be devised.

Then, the present invention aims to improve the display of operation indicator to provide a game apparatus capable of enhancing enjoyability of the game and the computer program used for the game apparatus.

Solution to Problem

The game apparatus of the present invention is a game apparatus comprising: a display device which is provided in such a way that a display surface thereof faces upward; a plurality of operation units each of which is disposed around the display surface, and has at least one operation member which outputs a signal in reply to an operation by a player; a storage device which stores data in which operations to be performed in a game to each operation member of the plurality of operation members are described in such a way that each of the operations is correlated to time on a game; an operation indication device which indicates the operation to the player at the time of operation described in the data by moving an operation indicator from an appearance position on the display surface toward an indication position set for each of the operation units; wherein the operation indication device has: an appearance position control device which controls the appearance position on the display surface so as the appearance position to be variable; an indicator position calculation device which calculates, based on a distance from the appearance position up to the indication position and time span between the time when the operation indicator appears at the appearance position and the time described in the data, a moving speed of the operation indicator to be required so as the operation indicator to reach the indication position of each operation unit at the time described in the data, and determines a display position of the operation indicator based on the moving speed calculated; and an indicator display control device which displays the operation indicator on the display surface based on the position of the operation indicator determined by the indicator position calculation device so that the operation indicator moves by following the moving speed.

According to the game apparatus of the present invention, the appearance position control device controls the appearance position of the operation indicator so as the appearance position to be variable. Thereby, the appearance position of the operation indicator is not fixed on the display surface, and varies suitably. Then, the moving speed is calculated based on the distance from the appearance position up to the indication position of each operation unit and the time length that it takes for the operation indicator to travel the distance, and the display position of the operation indicator is determined so that the operation indicator reaches the indication position at a predetermined time. Accordingly, even if the appearance position varies, it is possible to instruct the player to operate the operation member at the time described in the data.

As one aspect of the game apparatus of the present invention, the indicator position calculation device, by specifying as a representative point, a point which exists on a line connecting between the appearance position and the indication position and which should reach the indication position at the time of operation described in the data, may calculate the moving speed of the representative point, and may determines the display position of the representative point, and the indicator display control device may display the operation indicator based on the display position of the representative point. Moreover, the indicator display control device may display the operation indicator in a closed shape by interpolating between the representative points, and may display the operation indicator in such a way that the indicator extends from the appearance position up to the representative point. Namely, in the present invention, the movement of the operation indicator denotes that a portion, which should reach the indication position at the predetermined time, varies by degrees on the display surface. It includes not only a case that the position of the entire operation indicator varies by degrees, but also a case that the position of one portion of the indicator varies by degrees on the display surface. The game apparatus of the present invention may further comprise an evaluation device which evaluates the operation by the player based on a difference between the time of operation indicated by the operation indicator and the time when the player has operated the operation member.

The computer program of the present invention is a computer program being applied to a computer of a game apparatus comprising: a display device which is provided in such a way that a display surface thereof faces upward; a plurality of operation units each of which is disposed around the display surface, and has at least one operation member which outputs a signal in reply to an operation by a player; and a storage device which stores data in which operations to be performed in a game to each operation member of the plurality of operation members are described in such a way that each of the operations is correlated to time in a game, the computer program for indicating the operation to the player at the time of operation described in the data by moving an operation indicator from an appearance position on the display surface toward an indication position set for each of the operation units, wherein the computer program is constructed so as the computer to function as: an appearance position control device which controls the appearance position on the display surface so as the appearance position to be variable; an indicator position calculation device which calculates, based on a distance from the appearance position up to the indication position and time span between the time when the operation indicator appears at the appearance position and the time described in the data, a moving speed of the operation indicator to be required so as the operation indicator to reach the indication position of each operation unit at the time described in the data, and determines a display position of the operation indicator based on the moving speed calculated; and an indicator display control device which displays the operation indicator on the display surface based on the position of the operation indicator determined by the indicator position calculation device so that the operation indicator moves by following the moving speed.

By making a computer of the aforementioned game apparatus read the computer program of the present invention to execute it, it is possible to realize the game apparatus of the present invention. Additionally, the computer program of the present invention may be constructed to further realize each of the aforementioned aspects of the game apparatus of the present invention. The computer program of the present invention may be stored in a memory medium to be provided to a computer, or may be provided to a computer through a network.

BRIEF DESCRIPTION OF DRAWINGS

FIG. 4 is a diagram showing one example of operation sequence data stored in an external storage device shown in FIG. 3.

BEST MODE FOR CARRYING OUT THE INVENTION

Figure 1:
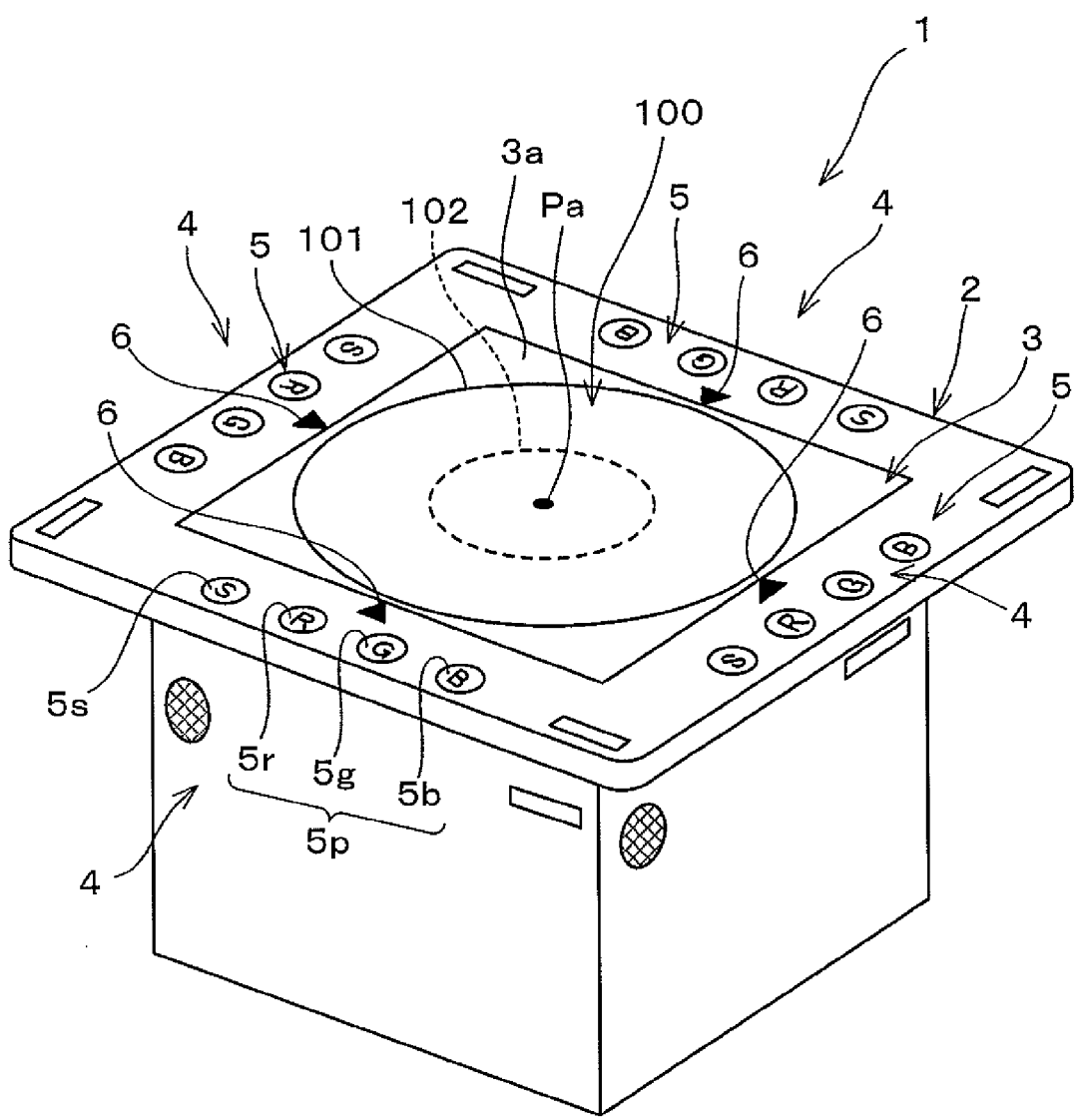
FIG. 1 is a perspective view of a game apparatus according to one aspect of the present invention.

FIG. 1 is a perspective view of a game apparatus according to one aspect of the present invention. The game apparatus 1 comprises a chassis 2 in the shape of a table. The upper surface of the chassis 2 is plane. In the center of the chassis 2, a monitor 3 as a display device is provided in a state that a display surface 3a thereof faces upward. Although a flat-panel display and the like is applied to the monitor 3, by covering the periphery of the panel, the display surface 3a of the game apparatus 1 has the shape of a square. Around the monitor 3, four operation units 4 are provided, each of the four operation units 4 being along each of four sides of the chassis 2. Each of the operation units 4 is correlated to one player. Thereby, in the game apparatus 4, four players can play a game at the same time. However, the present invention does not exclude a case that plural players play at one operation unit 4.

In each operation unit 4, four operation buttons (operation members) 5s,5r,5g,5b are aligned. A letter of "S, R, G, B" is given to each of the operation buttons 5s,5r,5g,5b. In what follows, when it is not necessary to distinguish the four operation buttons, each of them is sometimes referred as the operation button 5. Additionally, each of R-button 5r, G-button 5g and B-button 5b is sometimes correctively referred to as the play button 5p. Each operation button 5 outputs a predetermined operation signal in replay to a push operation to the operation button 5. Although the game apparatus 1 is configured as a game apparatus for business use which provides a predetermined range of game in exchange of a consumption of a predetermined play value, the game apparatus of the present invention is not limited to be for business use.

In the game apparatus 1 of the present embodiment, a music piece selected by a player is reproduced as a BGM (a back ground music), and a game progresses by making the player operate the play button 5p in accordance with the progress of the music piece. Namely, the game apparatus 1 is configured as a music game apparatus which is a type to make the players compete for the operations in accordance with the music piece with each other. In the display surface 3a of the monitor 3, a operation indication image 100 is displayed as an image for indicating the operation to the play button 5p in each operation unit 4. The operation indication image 100 includes an operation criterion line 101 having a circular shape and an operation indicator 102 having a ring-like shape as composition elements thereof, the operation criterion line 101 being displayed so as to be almost inscribed in a periphery of the display surface 3a, and the operation indicator 102 moving on the display surface 3a by degrees from the appearance position Pa toward the operation criterion line 101. At the almost central position of each side of the chassis 2, a criterion mark 6 in the shape of a triangle is provided. The criterion mark 6 indicates an indication position to be a criterion in order for the player to recognize the timing of operation indicated by the operation indication image 100.

Figure 2A:
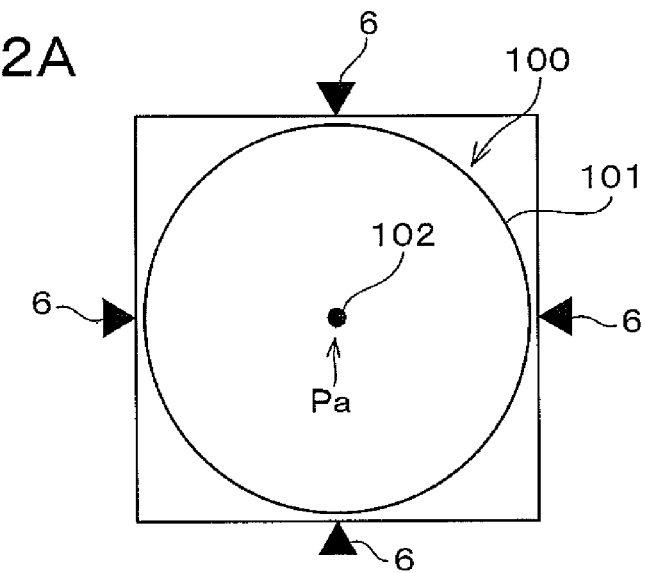
FIG. 2A is a diagram showing a state that an operation indicator has appeared on a display surface.
Figure 2B:
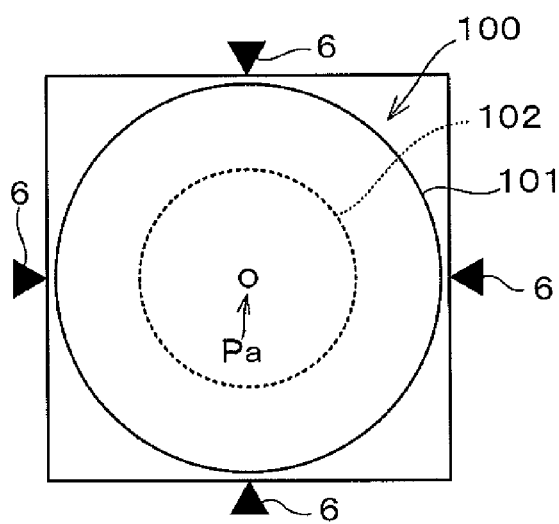
FIG. 2B is a diagram showing a mid-state that an operation indicator is expanding.
Figure 2C:
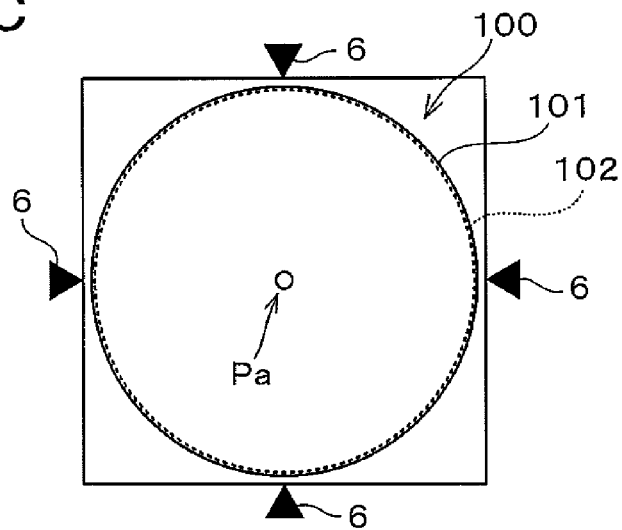
FIG. 2C is a diagram showing a state that an operation indicator has reached an operation criterion line.

Each of FIGS. 2A to 2C is a diagrams showing one of embodiments of operation indication by the operation indication image 100. As shown in FIG. 2A, in the game apparatus 1 in the present embodiment, in one time of game being played, the operation indicator 102, which is in the shape of a dot or a circle having a minute radius, appears at the appearance position Pa in the image 100 at a predetermined time. After appearing, the operation indicator 102 expands by degrees outward in a direction of radius in accordance with the temporal progress on the game. FIG. 2B shows a mid-state that the operation indicator 102 is moving. As shown in FIG. 2C, when the operation indicator 102 moves to a position to overlap the operation criterion line 101, it is the timing (the time) to operate the play button 5p. In what follows, the timing indicated by the operation criterion line 101 and the operation indicator 102 is referred to as the input timing. An attribute is given to the operation indicator 102 in order to indicate which one of the R-button 5r, the G-button 5g, and the B-button 5b should be operated. For example, in a case that R-button 5r, G-button 5g, and B-button 5b are colored red, green, and blue respectively, the color equal to the color of the play button 5p to be operated is given to the operation indicator 102 as the attribute. In one example, when the R-button 5r is an operation object, the operation indicator 102 is colored red. Although the appearance position Pa is shown as a small circle in FIG. 2B and FIG. 2C, actually it is not necessary to show the circle at the position Pa.

At the game apparatus 1, when the player operates the play button 5p of the operation object (that is, the play button 5p correlated to the attribute of the operation indicator 102) to the input timing indicated by the operation criterion line 101 and the operation indicator 102, the difference between the timing when the player has operated (in what follows, this timing is referred to as the operation timing) and the input timing is evaluated by the game apparatus 1. The smaller the difference between the two timings is, the higher the operation by the player is evaluated, and the result (the score) of the player increases. In one time of game, such the evaluation of the difference between the indication of the input timing and the operation timing is repeated. Additionally, in FIGS. 2A to 2C, though the appearance position of the operation indicator 102 is set at the center in the display surface 3a, the appearance position varies suitably for each game or in the middle of one time of game. The one time of game denotes a game of the range of one music piece to be reproduced as the BGM.

Figure 3:
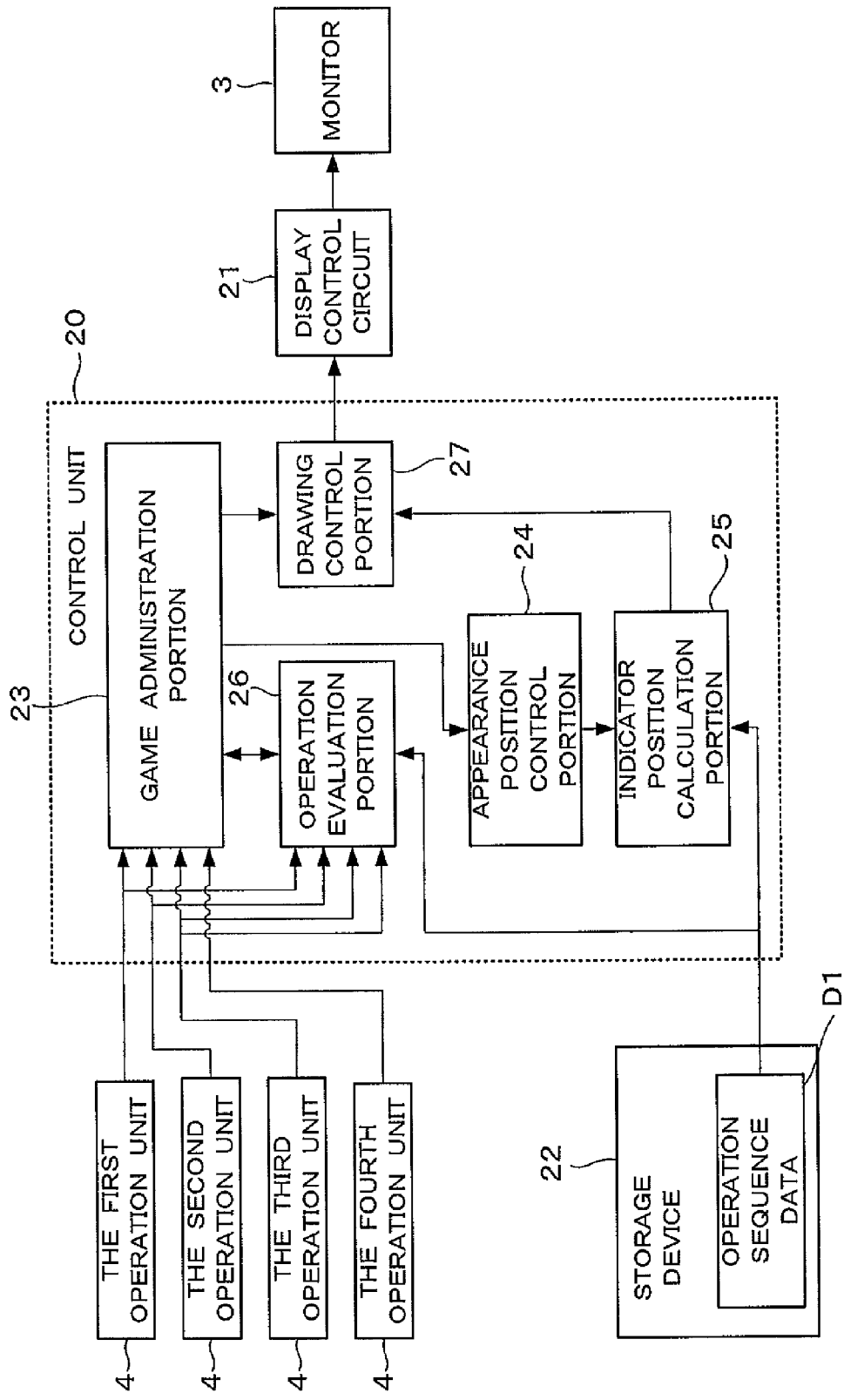
FIG. 3 is a block diagram showing a configuration of a control system in the game apparatus shown in FIG. 1.

FIG. 3 is a block diagram showing a configuration of a control system in the aforementioned game apparatus 1. In the game apparatus 1, a control unit 20 is provided for executing the game. The control unit 20 is configured as a computer unit including a micro processor and a main memory device such as a RAM, a ROM and the like necessary for operations of the micro processor. With the control unit 20, the operation button 5 in each of the aforementioned operation units 4 (referred to as the first control portion to the fourth control portion in the diagram) is connected as an input device, and the monitor 3 is connected as an output device. Additionally, with the control unit 20, an external storage device 22, where a computer program and various kinds of data for the game is stored, is connected.

The computer program stored in the external storage device 22 is suitably read out and executed by the control unit 20. Thereby, in the inside of the control unit 20, a game administration portion 23, an appearance position control portion 24, an indicator position calculation portion 25, an operation evaluation portion 26 and a drawing control portion 27 are constructed as logical devices. The game administration portion 23 executes processing such as the selection of a condition to execute the game, for example, the selection of a game stage, a difficulty level or the like, the control of images, BGMs and the like for the start, the end and the middle of game, and the administration of the game results (the game scores) of players.

The appearance position control portion 24 controls the appearance position Pa of the operation indicator 102 so as the appearance position Pa to be variable, referring information provided from the game administration portion 23. The indicator position calculation portion 25 executes a calculation for specifying a display position of the operation indicator 102 based on the current time on the game, provided from the game administration portion 23, information of the appearance position Pa provided from the appearance position control portion 24, and operation sequence data D1 stored in the external storage device 22, and outputs, based on the result of calculation, information indicating the display position of the operation indicator 102 and the attribute of the operation indicator 102. At the moment when the game is executed, the operation sequence data D1 is read out from the external storage device 22 and stored in the main memory device (not shown in the drawings) in the control unit 20. The detail of the operation sequence data D1 will be described later. The operation evaluation portion 26 evaluates a difference between the input timing and the operation timing for each operation unit 4 based on the current time on the game provided from the game administration portion 23 and the operation sequence data D1, and feeds back the evaluation result to the game administration portion 23.

The drawing control 27 draws a game screen repeatedly at a constant frequency, referring information of the game screen (except the operation indicator 102) provided from the game administration portion 23 and information (the position and attribute) of the operation indicator 102 provided from the indicator position calculation portion 25. The data of the game screen drawn by the drawing control 27 is output to a display control circuit 21. The display control circuit 21 outputs image signals to the monitor 3 so that the game screen corresponding to the data output from the drawing control portion 27 is displayed.

FIG. 4 shows one example of the operation sequence data D1. The operation sequence data D1 is data defining the input timing of the play button 5p, and prepared for each music piece which would be reproduced for the game. Note that plural types of the operation sequence data may be prepared depending on a difficulty level or the like for one music piece. In the example shown in FIG. 4, the operation sequence data D1 is constructed as table-type data, in which an elapse time t0, t1, t2 . . . from a predetermined criterion time in the game is associated with an R-flag, a G-flag, and a B-flag. The R-flag, the G-flag, and the B-flag correspond to the R-button 5r, the G-button 5g, and the B-button 5b respectively. The value "1" of each flag indicates a state of ON of the play button corresponding to the flag, and the value "0" indicates a state of OFF of the play button corresponding to the flag. Accordingly, the time t0, t1 is the input timing of the R-button 5r, and the time t2 is the input timing of the G-button 5g. The criterion point of time is set as a start point of a music piece to be reproduced for the game. The first time t0 could be set as an end point of an introduction part in the music piece. The operation sequence data D1 is common to all of the operation units 4. That is, in the game apparatus 1 of the present invention, to all of the operation units 4, the instruction is given so that the same play button 5p is operated at the same input timing.

Figure 5:
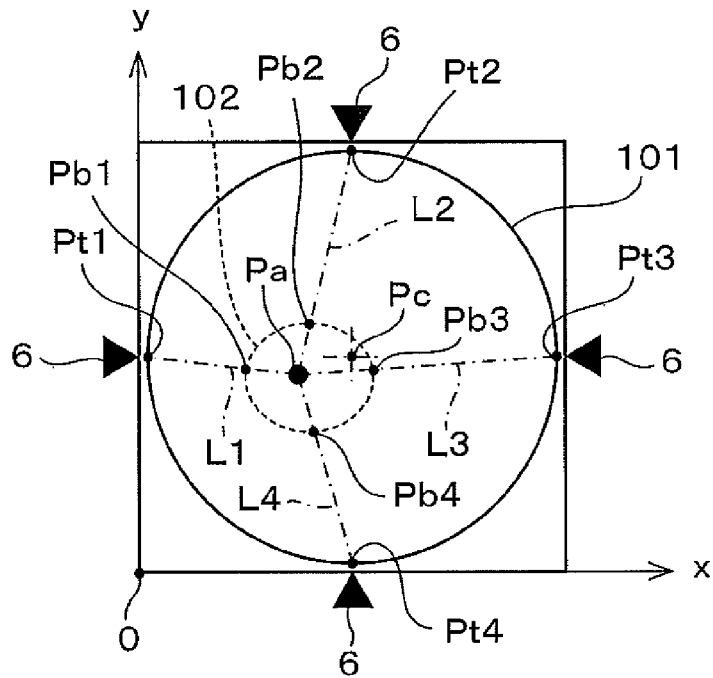
FIG. 5 is a diagram showing a sate that an appearance position is set at a position which is off-centered in a display surface.

Next, it will be described how the control unit 20 displays the operation indicator 102. FIG. 5 shows a state that the appearance position Pa of the operation indicator 102 is set at the position shifted from the center Pc in the display surface 3a of the monitor 3 by the aforementioned appearance position control portion 24 in the control unit 20. In the control unit 20, various kinds of positions, such as the appearance position Pa and the position of the operation indictor 102, are specified as coordinate values in a X-Y coordinate system which regards an appropriate position in the display surface 3a as an origin O (here, the left-lower angle is regarded as the origin O) and is parallel to each side of the display surface 3a. The determination of the appearance position Pa will be described later. As mentioned above, in the operation sequence data D1, the input timing common to all of the operation units 4 is set. Accordingly, the operation indicator 102 has to reach at the same time, the positions (in what follows, each of the positions is referred to as the target position) on the operation criterion line 101 indicated by the criterion positions 6 respectively. When the appearance position Pa is set on the center in the display surface 3a, it is enough to move the operation indicator 102 from the appearance position Pa toward each of the operation units 4 at an equal speed. However, when the appearance position Pa is shifted from the center, it is necessary to make a difference between the moving speeds of the operation indicator 102 from the appearance position Pa up to each of the operation units 4. Then, the indicator position calculation portion 25 controls the movement of the operation indicator 102 as the following method.

Figure 6:
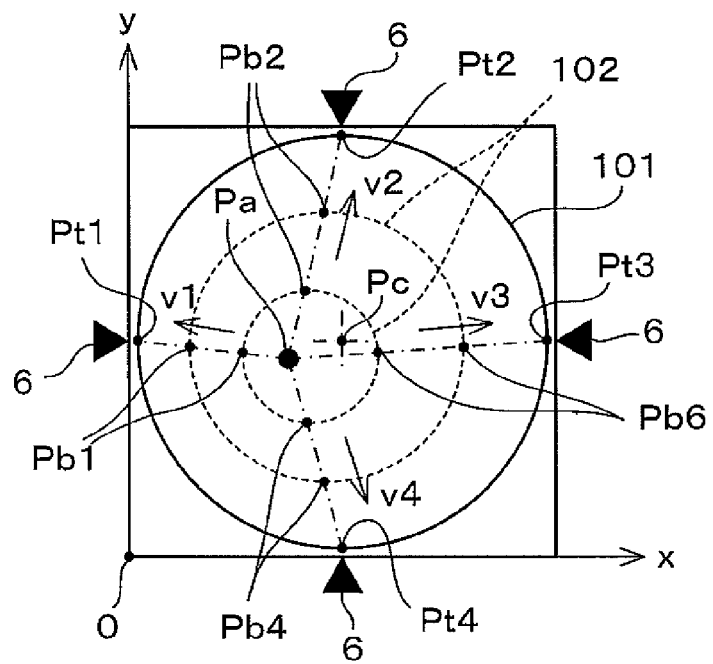
FIG. 6 is a diagram showing a state that an operation indicator varies from the appearance position in FIG. 5 to a target position of each operation unit.
Figure 7:
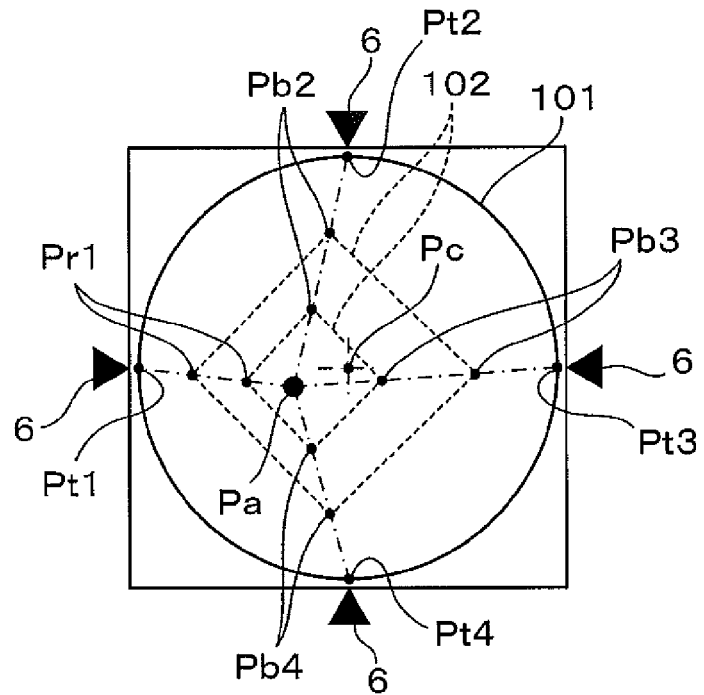
FIG. 7 is a diagram showing one of variations of FIG. 6.
Figure 8:
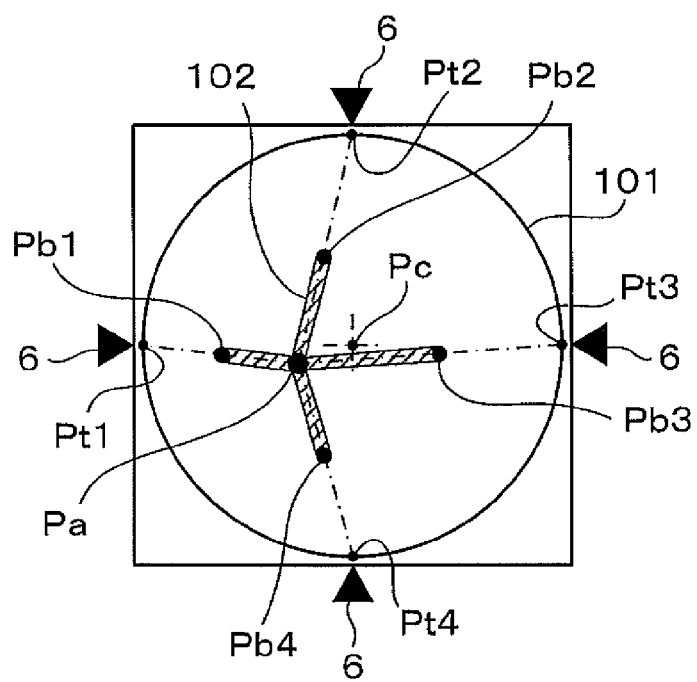
FIG. 8 is a diagram showing another one of variations of FIG. 6.
Figure 9:
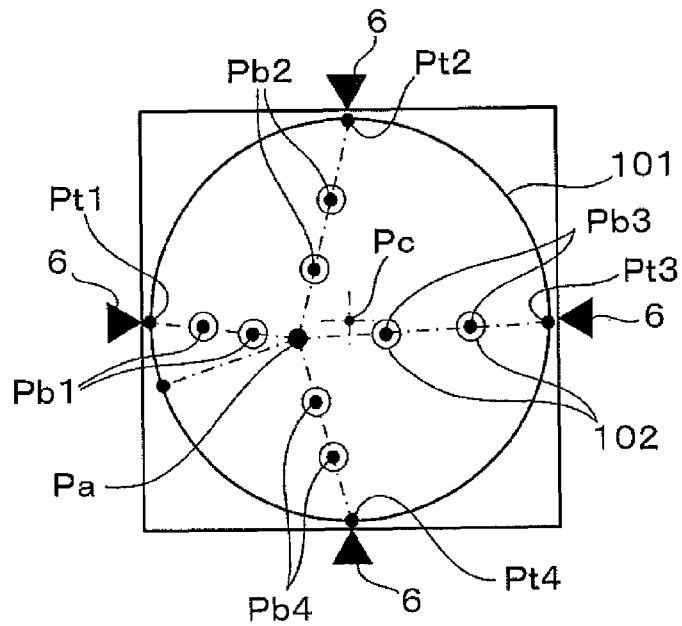
FIG. 9 is a diagram showing further another one of variations of FIG. 6.

When the coordinate value of the appearance position Pa is provided from the appearance position control portion 24, the distances of lines L1 to L4 extending between the appearance position Pa and the target positions Pt1 to Pt4 on the operation criterion line 101 are specified respectively. Note that each of the target positions Pt1 to Pt4 is a position which is the nearest to the criterion mark 6 and on the criterion line 101, and corresponds to the indication position of the present invention. Next, an access time that it takes for the operation indicator 102 to reach the target positions Pt1 to pt4 from the appearance position Pa is determined. The access time is time length between the time to make the operation indicator 102 appear at the appearance position Pa and the time t0, t1 . . . of the input timing defined in the operation sequence data D1. The time to make the operation indicator 102 appear is determined as the time, for example, going back the time length corresponding to four quarter notes of the BGM from the input timing. Subsequently, from the determined access time and the determined distance, the moving speeds of intersection points Pb1 to Pb4 of the lines L1 to L4 with the operation indicator 102 (in what follows, these intersection points are referred to as representative points) are calculated respectively. The representative points Pb1 to Pb4 exist on the line L1 to L4 respectively, and has to reach the target positions Pt1 to Pt4 on the operation criterion line 101 respectively at the time for operation (the input timing) defined in the operation sequence data D1.

when the moving speeds of the representative points Pb1 to Pb4 are determined, the representative points Pb1 to Pb4 is made move by degrees to the temporal progress on the game from the appearance position Pa on the lines L1 to L4 respectively. Moreover, by interpolating the spaces between the representative points Pb1 to Pb4 with the Bézier Curve or the like, like the arrows v1 to v4 shown in FIG. 6, it is possible to display a state that the ring-like operation indicator 102 expands by degrees from the appearance position Pa to the target positions Pt1 to Pt4. Note that the embodiment of the operation indicator 102 is not limited to the ring-like embodiment obtained by interpolating between the representative points Pb1 to Pb4 with the Bézier Curve, and other suitable embodiments could be applied. For example, as shown in FIG. 7, connecting between the representative points Pb1 to Pb4 with straight lines, the operation indicator 102 in a rectangular shape could be displayed. In addition, connecting between the representative points Pb1 to Pb4 with various kinds of lines, the operation indicator 102 in a closed shape could be displayed. Some rendering such as a wave pattern can be added to the operation indicator 102. Alternatively, a shown in FIG. 8, the operation indicator 102 extending in a radial fashion from the appearance position Pa up to the representative points Pb1 to Pb4 could be displayed. As shown in FIG. 9, the objects independent of each other corresponding to the representative points Pb1 to Pb4 respectively could be treated as the operation indicator 102. Each of the objects is represented as a circular shape object in FIG. 9, but theses objects could be represented as a various kinds of embodiments such as a figure, a character and the like.

Figure 10:
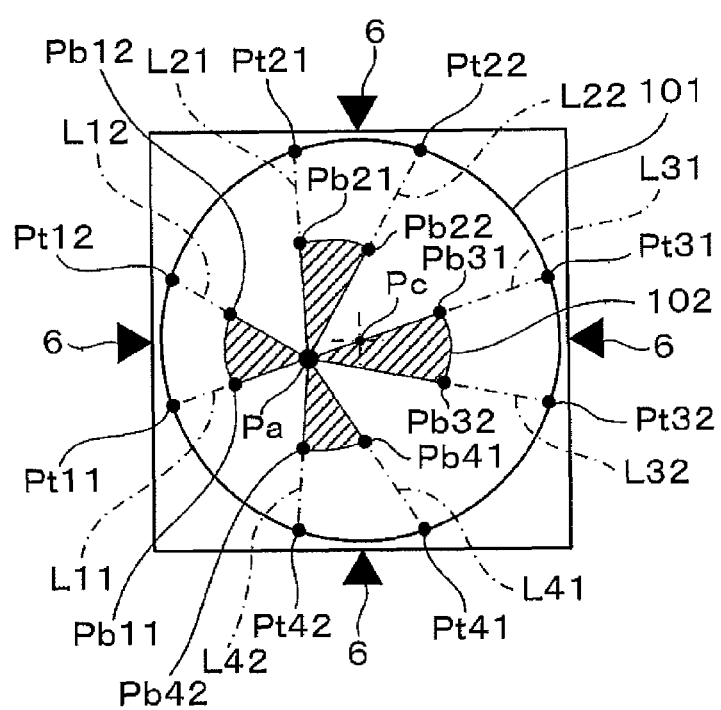
FIG. 10 is a diagram showing an example in which the operation indicator of a two-dimensional figure is shown.

As shown in FIG. 10, the operation indicator 102 represented as two dimensional plane could be displayed from the appearance position Pa toward the criterion marks 6. Such operation indicator 102 is also one kind of operation indicator 102 extending from the appearance position Pa up to the representative points. In this case, as the indication position, symmetric two target positions Pt11,Pt12,Pt21,Pt22 . . . across each criterion mark 6 are set. Then, the moving speed of each of the representative points Pb11, Pb12 . . . is calculated in the similar way to the above mentioned. The representative points Pb11, Pb12 . . . are on the lines L11,L12 . . . connecting between the appearance position Pa and the target positions Pt respectively. After that, for each operation unit 4, an area from the representative points Pb11, Pb12 . . . up to the appearance position Pa and existing between the straight lines L11, L12 . . . is specified. The operation indicator 102 could be drawn such that the areas specified are clearly distinguished from each other. Note that when the spaces between the representative points Pb11, Pb12 . . . are interpolated with the Bézier Curve or the like, it is possible to draw the operation indicator 102 in fan-like fashion, and when the spaces between the representative points Pb11, Pb12 . . . are connected with a straight line, it is possible to draw the operation indicator 102 in triangle-like fashion.

Figure 11:
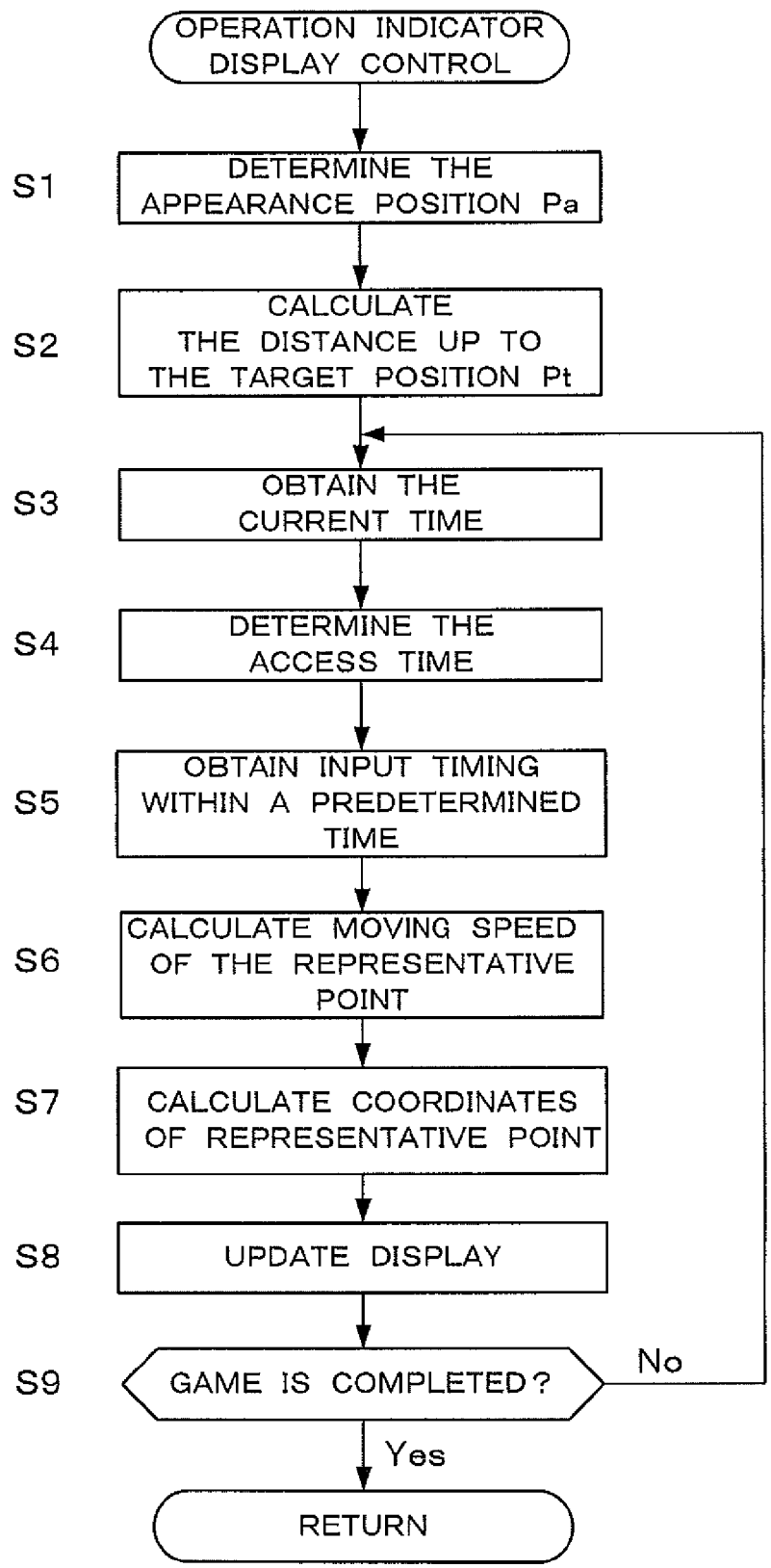
FIG. 11 is a flowchart showing an operation indicator display control routine to be executed for controlling a display of the operation indicator by a control unit shown in FIG. 3.

FIG. 11 is a flow chart showing an operation-indicator display control routine which is executed by the control unit 20 for realizing the aforementioned display method. When one time of game starts, this routine is executed in parallel with other processes which should be executed during the game. In what follows, in a case that the operation indicator 102 is displayed as the embodiment shown in FIGS. 5 and 6, the procedures shown in FIG. 11 will be described. Further, the appearance position Pa varies for each game, and the position Pa is constant during one time of game.

Figure 12:
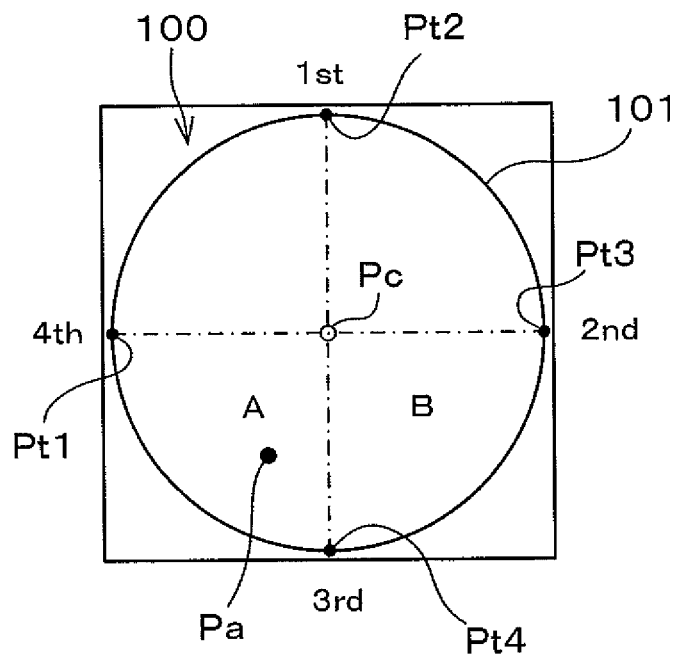
FIG. 12 is a diagram showing an example of methods for determining the appearance position depending on relative relationship between game results of players.
Figure 13:
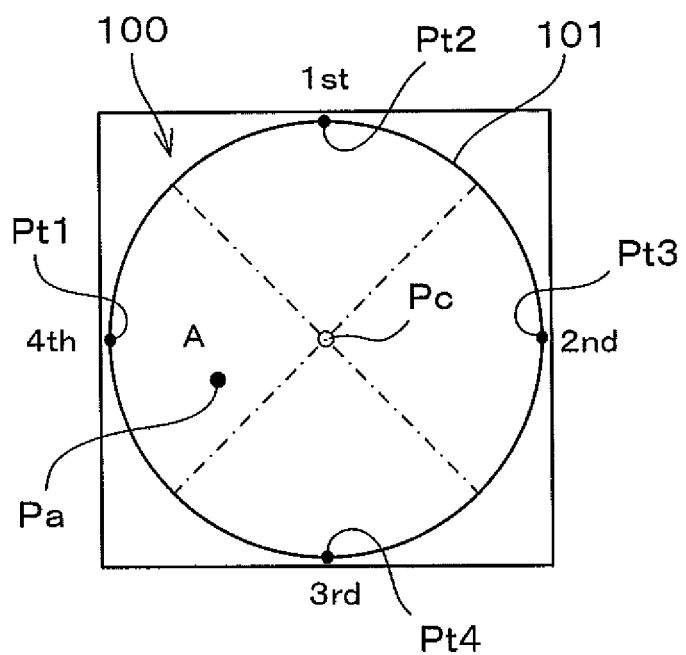
FIG. 13 is a diagram showing another example of methods for determining the appearance position depending on relative relationship between game results of players.

In the first step S1 of the operation-indicator display routine, the information necessary for determining the appearance position Pa is provided from the game administration portion 23 to the appearance position control portion 24. Thereby, in the appearance position control portion 24, the coordinates of the appearance position Pa is determined. For example, the appearance position Pa may be determined depending on a music piece selected by the player, or the appearance position Pa may be determined at random for each game. When the game apparatus 1 can obtain a past game history of each player by itself or through a network, the appearance position Pa may be determined depending on the past game history of each player seated at each operation unit 4. For example, in a case that the smaller the distance between the appearance position Pa to the target position Pt, the slower the moving speed becomes and the easier the input timing is grasped, the appearance position Pa may be determined in such a way that the target position Pt of the operation unit 4 where the player is seated, the player's past game result being the lowest within the players being seated at the four operation units 4, is the nearest to the appearance position Pa. FIG. 12 shows an example of a method of setting such an appearance position Pa. In this example, it is assumed that the past game results of four players being seated at the operation units 4 are split from the first place to the fourth place as shown in the drawing. The inside of the operation criterion line 101 is divided into four areas by two straight lines, each of which connects the target positions Pt1~Pt4 locating at the opposite sides across the center Pc of the display surface 3a. In this case, first, the area A and the area B where the most far from the target position Pt2 corresponding to the first place are selected, and next, within the selected the areas A and B, the area A where the nearest to the target position Pt1 corresponding to the fourth place is selected. Then, the appearance position Pa may be determined at an appropriate position in the area A. In the example shown in FIG. 13, the inside area of the operation criterion line 101 is divided into four areas by borders each of which is located at a middle position between the target positions Pt1 to Pt4. In this case, the appearance position Pa may be determined at an appropriate position in the area A including the target position Pt1 corresponding to the fourth place.

Figure 14:
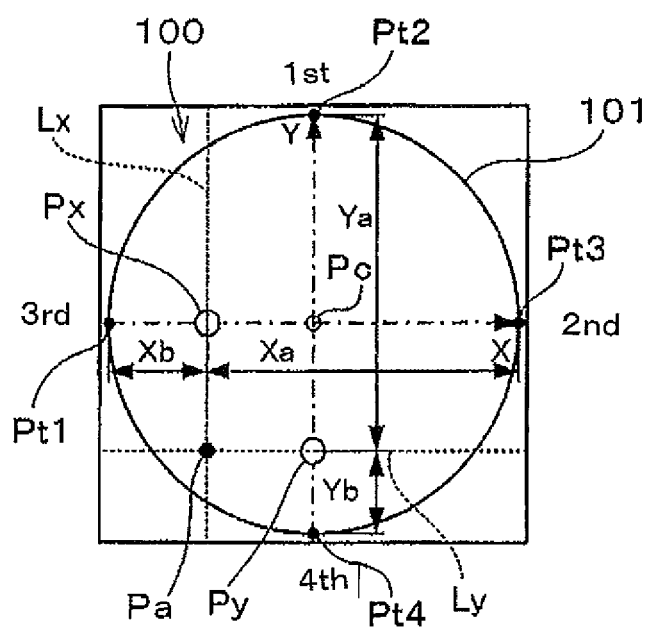
FIG. 14 is a diagram showing further another example of methods for determining the appearance position depending on relative relationship between game results of players.

FIG. 14 shows the other example that the appearance position Pa varies depending on the game results. In this example, an X axis is set between the target positions Pt1, Pt3 which face each other across the center Pc in the display surface 3a, and a Y axis is set between the target positions Pt2, Pt4. The difference between the game results of the players corresponding to the targets positions Pt2, Pt4 on the Y axis is calculated, and the point Py is set at a position which is shifted from the center Pc toward the target position of a lower game result (in this example, Pt4) by the distance representing the rate of Ya:Yb depending on the difference. Then, the line Ly in parallel with the X axis and running through the point Py can be obtained. On the other hand, the difference between the game results of the players corresponding to the targets positions Pt1, Pt3 on the X axis is calculated, and the point Px is set at a position which is shifted from the center Pc toward the target position of a lower game result (in this example, Pt1) by the distance representing the rate of Xa:Xb depending on the difference. Then, the line Ly in parallel with the Y axis and running through the point Px can be obtained.

Returning to FIG. 11, the description is continued. When the appearance position Pa is determined in step S1, the process goes to step S2. In step S2, the coordinates of the appearance position Pa are provided to the indicator position calculation portion 25, and each distance from the appearance position Pa up to the target position Pt of each of the operation units 4 is calculated. In subsequent step S3, the current time on the game, which is counted by the game administration portion 23, is obtained at the indicator position calculation portion 25. The current time on the game is the elapse time aforementioned from the criterion time. In subsequent step S4, the access time it takes for the operation indicator 102 to move from the appearance position Pa up to the target position Pt is determined by the indicator position calculation portion 25. The access time is determined suitably to the tempo of the music piece afore mentioned, such as the time length corresponding to four of quarter notes of the music piece. In subsequent step S5, by referring to the operation sequence data D1 corresponding to the music piece being reproduced, the input timings are obtained, the input timings coming within in a predetermined time length from the current time on the game to the future. The predetermined time length in this case is equal to the access time aforementioned. Namely, the input timings corresponding to all of the operation indicators 102 which should be displayed in the display surface 3a at the moment are obtained at step S5.

In subsequent step S6, the moving speed of the representative point Pb corresponding to each of the input timing is calculated by the indicator position calculation portion 25 based on the distance obtained in step S2 and the access time obtained in step S4. In subsequent step S7, based on the moving speed calculated, the coordinates in the display surface 3a of each representative point are calculated by the indicator position calculation portion 25. After calculating the representative point, the process goes to step S8 in which the coordinates of each representative point Pb are provided from the indicator position calculation portion 25 to the drawing control portion 27 with the attributes (as one example, color information specifying the kind of play button 5p) of the input timing corresponding to the representative point Pb. In the drawing control portion 27, the operation indication image 100 is updated so that the operation indicator 102, which corresponds to the coordinates and the attributes of the representative point Pb provided, is displayed in the display surface 3a. In this case, when the operation indicator 102 is in a ring-like shape, the operation indicator 102 is drawn so that the spaces between the representative points are interpolated by the drawing control portion 27.

After the process in step S8, it is determined whether one time of game is completed or not. When the game is not yet completed, the process returns to step S3 to repeat the calculation of the position of the operation indicator 102 by the indicator position calculation portion 25 and the update of the operation indication image 100 by the drawing control portion 27. In step S9, when it is determined that the game is completed, the routine shown in FIG. 11 is terminated.

In the above embodiment, the control unit 20 is equivalent to the operation indication device. The appearance position control portion 24, the indicator position calculation portion 25, and the operation evaluation portion 26 are equivalent to the appearance position control device, the indicator position calculation device, and the evaluation device respectively.

The present invention is not limited to the aforementioned embodiment, and can be realized in various kinds of embodiments. For example, the display surface of the display apparatus is not limited to a level plane configuration. As long as the display surface is observed from the operation unit around the display surface, it is enough for at least one part thereof to face upward. Therefore, a hemispherical type and the other various kinds of embodiments can be applied to. The appearance position Pa may be varied during one time game. For example, when the tempo or the tone varies during a music piece, the appearance position Pa may be varied depending on the game scores of the players at the moment. Note that when the appearance position Pa is varied during one time game, a state could happen that a part of the operation indicator 102 which appears after the appearance position Pa varies is displayed on a display surface outside of the operation indicator 102 which has appeared before the appearance position Pa varies. In a case that it is necessary to exclude this state, it is enough to limit the appearance position Pa after being varied so that the appearance position Pa is included in an area existing inside of the operation indicator 102 which has appeared at the moment of varying the appearance position Pa.

Although, in the aforementioned embodiment, the operation criterion 101 having a circular shape is displayed on the display surface 3a, the display embodiment may be varied suitably as long as the player can grasp the indication position. For example, in order to indicate the indication position, a straight line, a two-dimensional figure, an object or the like may be displayed in the display surface 3a. Alternatively, not displaying by the monitor 3, a physical mark or the like may be provided on the display surface 3a. Moreover, although, in the above embodiment, the indication position is constant, the indication position may be also suitably varied like the appearance position for each game, or during the game. Even if the indication position varies, it is possible to calculate the moving speed of an operation indicator based on the distance between the appearance position and the indication position and time length it takes from the moment the operation indicator appears up to the moment the operation indicator reaches the indication position to specify the display position. While the operation indicator moves from the appearance position up to the indication position, some rendering may be added, for example, a part or all of the operation indicators may be erased are be deformed for a moment.

The present invention is not limited to a game apparatus in which operations are indicated to a player to a music piece. As long as an operation indicator is made to move toward an indication position to indicate the operation, the present invention can be applied to game apparatuses in various kinds of ganre. The operation units are not limited to four, and at least two of the operation units may be suitably provided. The number of the operation members of each operation unit may be suitably set to be at least one.

Although, in the aforementioned embodiment, the same operation is indicated to all of the operation units, different operation may be indicated for each operation unit. For example, a case is enough that information specifying the operation unit is included in the operation sequence data, and the display of operation indicator is controlled so that the operation is indicated to the specified operation unit at the specified time. In this case, the input timing is different for each operation unit. Thereby, it is preferable that the operation indication image is generated in an embodiment where, as shown in FIG. 8 to 10, each input timing can be indicated independently for each operation unit.

As mentioned above, according to the present invention, it is possible to control the display of the operation indicator so that the operation indicator reaches the indication position at a predetermined time length while the appearance position of the operation indicator being varied. Therefore, unhackneyed and unexpected performance is given to the display of the operation indicator, and thereby it is possible to enhance the enjoyability of game.

The invention claimed is:

1. A game apparatus comprising:
a display device including a display surface thereof facing upward;
a plurality of operation units, each of which is disposed around the display surface, and has at least one operation member configured to output a signal in reply to an operation by a player;
a storage device configured to store data in which operations to be performed in a game to each operation member of the plurality of operation units at a same time are described in such a way that each of the operations is correlated to time on a game, the time being a moment when each operation should be operated;
an operation indication device configured to indicate the operation to the player at the time of the operation described in the data by moving an operation indicator from an appearance position on the display surface toward an indication position set for each of the operation units, so that the operation indicator reaches the indication position at the time;
wherein the operation indication device has:
an appearance position control device configured to control the single appearance position on the display surface so that the appearance position is variable;
an indicator position calculation device configured to calculate a required moving speed of each operation indicator, based on a distance from the appearance position to each indication position and a time span between the time when the operation indicator appears at the appearance position and the time described in the data, so that the operation indicator reaches the indication position of each operation unit at the time described in the data, and determines a display position of the operation indicator based on the required moving speed as calculated; and
an indicator display control device configured to display the operation indicator on the display surface based on the position of the operation indicator determined by the indicator position calculation device so that the operation indicator moves by following the required moving speed.

2. The game apparatus of claim 1, wherein
the indicator position calculation device, by specifying as a representative point, a point which exists on a line connecting between the appearance position and the indication position and which should reach the indication position at the time of operation described in the data, calculates the moving speed of the representative point, and determines the display position of the representative point, and
the indicator display control device displays the operation indicator based on the display position of the representative point.

3. The game apparatus of claim 2, wherein the indicator display control device displays the operation indicator in a closed shape by interpolating between the representative points.

4. The game apparatus of claim 3, wherein the indicator display control device displays the operation indicator in such a way that the indicator extends from the appearance position up to the representative point.

5. The game apparatus of claim 1, further comprising an evaluation device which evaluates the operation by the player based on a difference between the time of operation indicated by the operation indicator and the time when the player has operated the operation member.

6. A computer readable storage medium storing a computer program being applied to a computer of a game apparatus comprising: a display device including a display surface thereof facing upward; a plurality of operation units, each of which is disposed around the display surface, and has at least one operation member configured to output a signal in reply to an operation by a player; and a storage device configured to store data in which operations to be performed in a game to each operation member of the plurality of operation units at a same time are described in such a way that each of the operations is correlated to time in a game the time being a moment when each operation should be operated, the computer program configured to indicate the operation to the player at the time of the operation described in the data by moving an operation indicator from an appearance position on the display surface toward an indication position set for each of the operation units, so that the operation indicator reaches the indication position at the time, wherein the computer program is constructed so as the computer to function as:

an appearance position control device configured to control the single appearance position on the display surface so that the appearance position is variable;

an indicator position calculation device configured to calculate a required moving speed of each operation indicator, based on a distance from the appearance position to each indication position and a time span between the time when the operation indicator appears at the appearance position and the time described in the data, so that the operation indicator reaches the indication position of each operation unit at the time described in the data, and determines a display position of the operation indicator based on the required moving speed as calculated; and an indicator display control device configured to display the operation indicator on the display surface based on the position of the operation indicator determined by the indicator position calculation device so that the operation indicator moves by following the required moving speed.

7. The game apparatus of claim 2, further comprising: an evaluation device which evaluates the operation by the player based on a difference between the time of operation indicated by the operation indicator and the time when the player has operated the operation member.

* * * * *